United States Patent
Di Benedetto et al.

(10) Patent No.: US 11,586,965 B1
(45) Date of Patent: Feb. 21, 2023

(54) TECHNIQUES FOR CONTENT SELECTION IN SEASONAL ENVIRONMENTS

(71) Applicant: Amazon Technologies, Inc., Seattle, WA (US)

(72) Inventors: Giuseppe Di Benedetto, Berlin (DE); Vito Bellini, Berlin (DE); Giovanni Zappella, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 370 days.

(21) Appl. No.: 16/858,241

(22) Filed: Apr. 24, 2020

(51) Int. Cl.
| | |
|---|---|
| *G06N 20/00* | (2019.01) |
| *G06N 7/00* | (2006.01) |
| *G06F 16/635* | (2019.01) |
| *G06F 16/2457* | (2019.01) |
| *G06N 5/04* | (2006.01) |
| *G06F 16/9535* | (2019.01) |

(52) U.S. Cl.
CPC .......... *G06N 7/005* (2013.01); *G06F 16/2457* (2019.01); *G06F 16/635* (2019.01); *G06N 5/04* (2013.01); *G06N 20/00* (2019.01); *G06F 16/24575* (2019.01); *G06F 16/9535* (2019.01)

(58) Field of Classification Search
CPC .......... G06N 7/005; G06N 5/04; G06N 20/00; G06F 16/2457; G06F 16/635; G06F 16/24575; G06F 16/9535
See application file for complete search history.

(56) References Cited

U.S. PATENT DOCUMENTS

| | | | |
|---|---|---|---|
| 11,113,745 B1 * | 9/2021 | Cetintas | G06Q 30/0625 |
| 2021/0142196 A1 * | 5/2021 | R | G06F 16/258 |

OTHER PUBLICATIONS

Hartland et al. Multi-armed Bandit, Dynamic Environments and Meta-Bandits. Hal Open Science Submitted in 2006, Evidenced by the Wayback Machine Dec. 22, 2017. Retrieved from <https://hal.archives-ouvertes.fr/hal-00113668/document> on Jul. 13, 2022 p. 1-8 (Year: 2017).*

Garivier et al. On Upper-Confidence Bound Policies for Switching Bandit Problems, International Conference on Algorithmic Learning Theory, 2011 p. 1-16 (Year: 2011).*

Wu et al. Dynamic Ensemble of Contextual Bandits to Satisfy Users' Changing Interests, In Proceedings of the 2019 World Wide Web Conference (WWW '19), May 13-17, 2019, ACM p. 1-11 (Year: 2019).*

* cited by examiner

*Primary Examiner* — Tonia L Dollinger
*Assistant Examiner* — Joseph M Cousins
(74) *Attorney, Agent, or Firm* — Kilpatrick Townsend & Stockton LLP

(57) ABSTRACT

Techniques are described herein for generating adaptive recommendations in response to a content request. The system herein detects abrupt changes and leverages the seasonality of a reward function. A collection of contextual models are utilized, each one learning about one of the unique reward stationary states. A short-term memory model is used to detect reward shifts toward stationary periods that have not occurred in the past. In this case, a new base bandit instance is initialized. In order to perform the change point detection, at each step every model gets assigned a score indicating how likely the last observation is to come from a corresponding stationary period represented by a respective model. A model is selected based on the scores. The model provides a recommendation and the system can monitor clickstream data to identify the reward for providing the recommendation.

20 Claims, 9 Drawing Sheets procedure
1:     Inputs: $\lambda, \tau, N_{max}$
2:     Initialize:
       Create ST contextual bandit model (CBM), S, and a CBM L1: L1, S = Init(∅)
       Set of CBMs: $\beta$ = {L1}, $N_L$ = 1
       Initialize weights: $\omega_S$ = 0.5, $\omega_1$ = 0.5
3:     for $b$ = 1 to B do
4:         Set $I_j$ = ∅ for all $j \in \beta \cup \{S\}$
5:         for $t$ in $b$ do
6:             Bandit selection: $j \sim$ Discrete($\omega_j : j \in \beta \cup \{S\}$)
7:             $I_j = I_j \cup \{t\}$
8:             $x_t$ = PlayBandit($j, A_t$)
9:             Monitor reward $r_t$
10:       end for
11:       if $I_S$ , ∅ then
12:           $N_L = N_L + 1$
13:           Create bandit $L_N$ = Init(S), $I_{LNL}$ = ∅
14:           $\beta = \beta \cup \{L_N\}$
15:       end if
16:       S = Init(∅) and Update(S, $(x_s, r_s)_s$=min($t-\tau$ +1,0):$t$)
17:       for $j \in$ B do
18:           Update base bandit $j$: Update($L_j$, $(x_s, r_s)s \in I_j$)
19:       end for
20:       if $N_L > N_{max}$ then
21:           Prune($\beta$)
22:       end if
23:       $(\omega_j)j \in \beta \cup\{S\}$ = UpdateWeights($\beta \cup\{S\}$, $(x_s, r_s)_s \in b$)
24:     end for
end procedure

FIG. 2

1: procedure INIT(L)
2:     if L = ∅ then
3:         return $M = \lambda \mathbb{1}_d$, $b = 0_d$, $\mu = 0_d$
4:     else
5:         return $M = M_L$, $b = b_L$, $\mu = \mu_L$
6:     end if
7: end procedure

FIG. 3 — 300

1: procedure PLAYBANDIT(L, $\mathcal{A}_t$)
2:     Sample $\hat{\theta}_j \sim \mathcal{N}(\mu_L, M_L^{-1})$
3:     return $x_t = \arg\max_{x \in \mathcal{A}_t} \langle \hat{\theta}_j, x \rangle$
4: end procedure

FIG. 4 — 400

1: procedure UPDATE(L, $(x_s, r_s)_{s \in I}$)
2:     $M_L = M_L + \sum_{i \in I} x_i x_i^T$, $b_L = b_L + \sum_{i \in I} x_i r_i$, $\mu_L = M_L^{-1} b_L$
3: end procedure

FIG. 5 — 500

1: procedure Prune($\mathcal{B}$)
2:     Long-memory bandits $j \in \mathcal{I}$
3:     $(i^*, j^*) = \arg\min_{(i,j) \in \mathcal{I}^2, i < j} \text{KL}_{\text{sym}}(\mathcal{N}(\mu_j, M_j^{-1}), \mathcal{N}(\mu_j, M_j^{-1}))$
4:     $i_{\text{delete}} = \arg\min_{k = i^*, j^*} \text{tr}(M_k^{-1})$
5:     $\mathcal{I} = \mathcal{I} \setminus \{L_{i_{\text{delete}}}\}$ and $N_L = N_L - 1$
6: end procedure

FIG. 6 — 600

1: procedure UPDATEWEIGHTS($\mathcal{I}, (x_s, r_s)_{s \in b}$)
2:     $\omega_j = \prod_{t \in b} p_j(r_t \mid x_t)$ for all $j \in \mathcal{I}$
3:     return $(\omega_j)_{j \in \mathcal{I}}$
4: end procedure

FIG. 7 — 700

TECHNIQUES FOR CONTENT SELECTION IN SEASONAL ENVIRONMENTS

BACKGROUND

Contextual algorithms are widely used in recommendation systems to provide online personalized recommendations (e.g., of content). A recurrent assumption in contextual algorithms is that the reward function is stationary, or said another way, that the reward function has a mean, variance, and autocorrelation structure that does not change over time. However, most recommendation systems operate in a highly non-stationary environment due to changes in the users' interests over time. Conventional recommendation systems in seasonal environments are not able to provide recommendations that are adapted to abrupt changes in user preferences.

BRIEF DESCRIPTION OF THE DRAWINGS

Various embodiments in accordance with the present disclosure will be described with reference to the drawings, in which:

FIG. 2 illustrates an example procedure for processing a batch of content requests, in accordance with at least one embodiment;

FIG. 3 illustrates an example procedure for initializing a number of parameters of a contextual bandit model, in accordance with at least one embodiment;

FIG. 4 illustrates an example procedure for utilizing a contextual bandit model to identify an action, in accordance with at least one embodiment;

FIG. 5 illustrates an example procedure for updating a contextual bandit model, in accordance with at least one embodiment;

FIG. 6 illustrates an example procedure for pruning a set of contextual bandit models, in accordance with at least one embodiment;

FIG. 7 illustrates an example procedure for updating weights associated with a set of contextual bandit models, in accordance with at least one embodiment;

DETAILED DESCRIPTION

Figure 1:
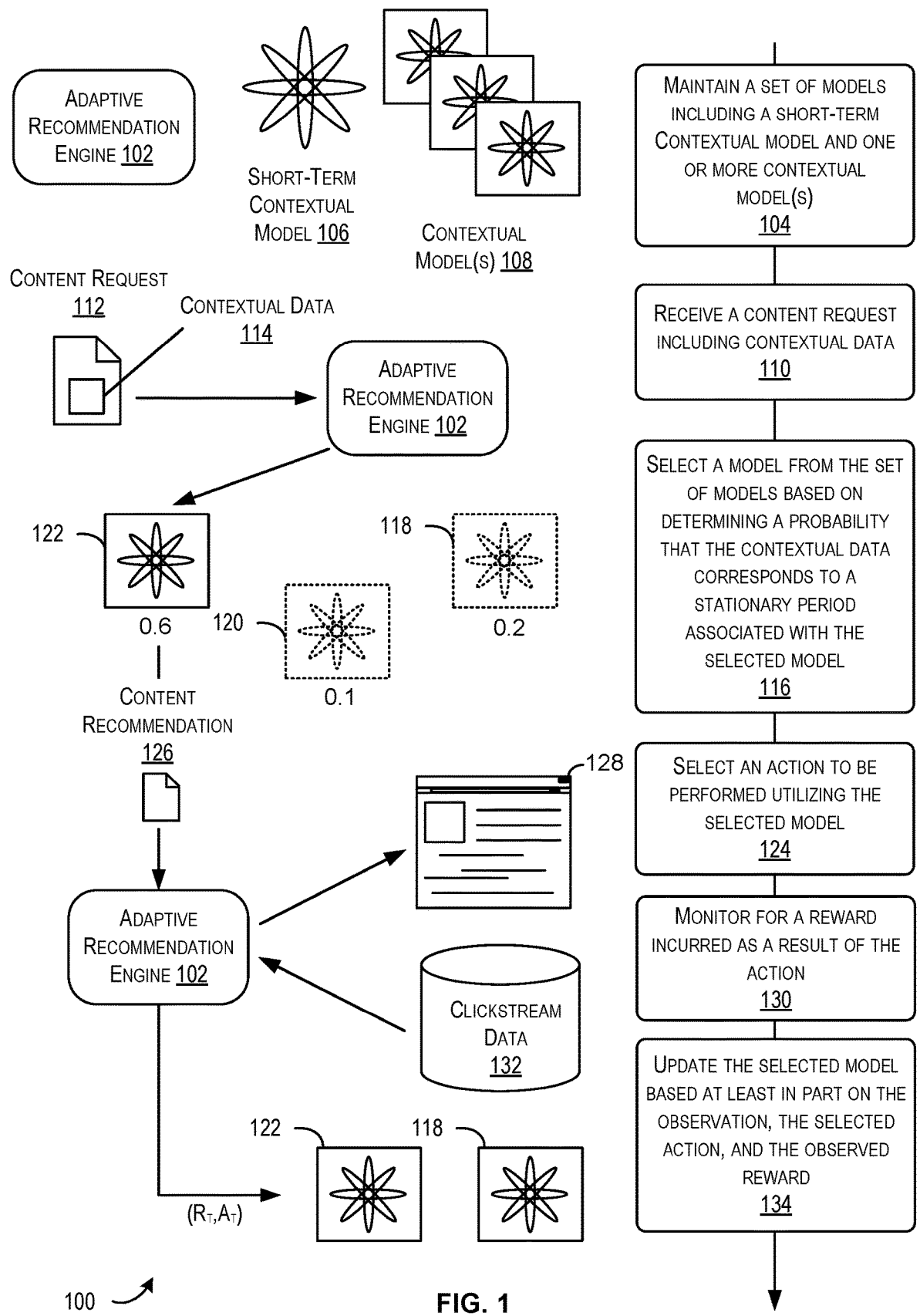
FIG. 1 illustrates an example flow for providing adaptive recommendations utilizing an adaptive recommendation engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to an adaptive recommendation engine that adapts content recommendations in an environment of non-stationary rewards with abrupt and possible seasonal changes. In some instances, the adaptive recommendation engine may implement a "bandit algorithm" (also referred to as a "bandit model"), which is a type of machine-learning model that utilizes reinforced learning techniques to map situations to actions so as to maximize a cumulative numerical reward signal based on trials. The learner is not told which action to take (e.g., which content recommendation(s) to make), but instead, must discover which actions yield the most reward by trying them. To increase reward, a reinforcement learning agent should prefer actions that it has tried in the past and found to be effective in producing reward. But to discover such actions, it has to try actions that it has not selected before. The agent has to exploit what it has already experienced in order to obtain reward, but it also has to explore in order to make better action selections in the future. The dilemma is that neither exploration nor exploitation can be pursued exclusively without failing at the task. A "contextual bandit algorithm" (also referred to herein as a "contextual bandit model" or, for brevity, a "contextual model") is a type of bandit model that determines actions based on the state of the environment (also referred to as "contextual data"). "Contextual data" may include data about the user (e.g., where they come from, previously visited webpages, device information, geolocation, etc.). A "short-term contextual bandit model" (also referred to, for brevity, as a "short-term contextual model") refers to a type of contextual bandit algorithm that considers only a predefined number of most-recent observations.

Bandit algorithms are widely used in recommender systems, due to their ability to efficiently deal with the exploration-exploitation trade-off in an online fashion. Moreover, contextual bandits are able to leverage contextual data (e.g., regarding the user or the device) often available in modern applications. A common assumption, which is often postulated, is the stationarity of the environment. Under this assumption, the aim of the algorithm is to obtain a precise estimate of the parameter that defines the mapping between contextualized actions and rewards.

The contextual bandit algorithm disclosed herein detects abrupt changes and leverages the seasonality of the reward function. It deploys a collection of base bandit instances, each one learning about one of the unique reward stationary states. Each bandit gets assigned a weight reflecting how likely recent observations are to come from the stationary periods described by it. A short-term memory bandit is used to detect reward shifts toward stationary periods that had not occurred in the past, and cannot therefore be described by the existing bandits. In this case, a new base bandit instance is initialized. In order to perform the change-point detection, at each step every contextual bandit model gets assigned a score indicating how likely the last observation is to come from one of the stationary periods represented by the available bandits. The normalized scores are used to sample the bandit which will play in the current time step. The collection of bandits used in the algorithm consists of a set of "long-term memory" instances, which are called contextual bandits, and a short-term memory one, which is referred to as a short-term contextual bandit. Each contextual bandit is configured to learn about one of the true values $\theta_s^*$s $\in \Theta$ of the reward parameter. The short-term bandit, which only considers the most recent observations, may be responsible for triggering the detection of changes to stationary states which had not been previously observed.

By way of example, a collection of contextual bandit models may be utilized, each one targeting a stationary state of the reward function. Using these models, predictions about recurrent stationary states can be reused and further updated. The collection of contextual bandit models has to learn about one of the true values $\theta^*$, s $\in \Theta$ of the reward parameter. The number of change points (e.g., indicating a shift in the reward function) is unknown a priori, therefore a short-term contextual bandit model is configured to detect these changes and recognizes whether such a state has already occurred. If so, the contextual bandit model which had learned about that value of the reward parameter may be chosen to interact with the environment. Alternatively, a brand new contextual bandit model may be created. For change point detection, every contextual bandit model is assigned a score indicating how likely the last observation is to come from one of the stationary periods represented by the available contextual bandit models. The normalized scores are used to sample the contextual bandit model which will play (e.g., select the content to be provided) in the current time step. The selected model can select content that is presented at a user device and the system may monitor for actions taken by the user in response to being presented that content (also referred to as a reward).

As a specific example, an adaptive recommendation system may interact with and/or be a part of an online music streaming service. In a music recommendation scenario for instance, people's music taste can abruptly change during certain events, such as Halloween or Christmas, and revert to the previous musical taste relatively soon after. When a user navigates to a webpage of the music streaming service, a request for content (e.g., a music recommendation) may be received by the adaptive recommendation system. The request can include contextual data (e.g., data about the environment from which the request was initiated such as any suitable data about the user and/or device). One or more contextual bandit models can then select an action for the request. For example, a selected contextual bandit model can select a particular music recommendation to provide in response to the request in light of what is known about the user and/or the requesting device (e.g., the contextual data).

In the example above, at each time step, a score may be calculated for each contextual bandit model and the short term bandit model based at least in part on calculating a posterior predictive probability that the last observation relates to a stationary period associated with a given bandit model. The action selected above can be selected by the contextual bandit model that has the highest score. Alternatively, if the short-term contextual bandit model received the highest score, a new contextual bandit model may be generated. The new contextual bandit model may be initialized with the parameters and short-term data utilized by the short-term contextual bandit model and the newly generated bandit model may be selected to identify the content to be provided in response to the content request in light of what is known about the user and/or the requesting device.

In either scenario, the recommendation is presented at the user device and the system may monitor the behavior of the user subsequent to the presentation of the recommendation. By way of example, clickstream data may be obtained indicating one or more clicks made by the user and the system can identify a reward value indicating whether the user clicked on the provided content or not. The selected contextual bandit model can be updated with the action and reward value.

By utilizing the techniques provided herein, the adaptive recommendation system may adapt to the seasonality of the user's preferences by utilizing a specific model that has been trained to make predications based on data conforming to that season and not others. This can provide improvements (e.g., more accurate predictions) over conventional recommendation systems as conventional systems do not exploit knowledge gained about past stationary states of the environment, with the need to pay extra exploration cost whenever a change-point occurs.

Moving on to FIG. 1 that illustrates an example flow 100 for providing adaptive recommendations utilizing an adaptive recommendation engine 102, in accordance with at least one embodiment. The flow 100 depicts an example in which adaptive recommendation is provided in response to user input related to an item provided in an electronic catalog.

The flow 100 may begin at 104, where the adaptive recommendation engine 102 may maintain a set of models including a short-term contextual model 106 and one or more contextual model(s) 108. The short-term contextual model 106 may be configured to consider a predefined number (e.g., 100) of the last most-recent observations, while the contextual model(s) 108 may be configured to consider (e.g., when making a prediction) only the observations attributed to the stationary period(s) to which they correspond.

At 110, a content request may be received by the adaptive recommendation engine 102. In some embodiments, the content request may include contextual data. Contextual data may include any suitable data known about the user and/or the user device with which the content request was made. By way of example, a user may utilize his user device to navigate to a web site that provides a music streaming service. The web browser of the user device (or a web server that hosts the website, not depicted) may be configured to transmit a content request 112 (e.g., a content recommendation) to a service provider computer (not depicted) that hosts the music streaming service. The adaptive recommendation engine 102 may execute on the service provider computer and may be configured to receive the content request 112. The content request 112 may include contextual data 114 (e.g., information about the environment) from which the content request was made. By way of example, the contextual data 114 may include user data (e.g., past webpages visited, user profile data (e.g., address, name, age, etc.), past content selections, past purchases, and the like) and/or device data (e.g., serial number, model number, phone number, etc.) of a device from which the content request 112 was initiated.

At 116, the adaptive recommendation engine 102 may select a model from the set of models based, at least in part, on determining a probability that the contextual data 114 corresponds to a stationary period associated with the selected model. As an example, the adaptive recommendations engine 102 may obtain a score for each contextual model it maintains (e.g., the short-term contextual model 106 and the contextual model(s) 108). The scores may be calculated based at least in part on a posterior predictive probability that the contextual data corresponds to a respective stationary period with which each contextual model corresponds. In some embodiments, the scores may be updated at a later time. By way of example, if the adaptive recommendation engine is processing a batch of observations (e.g., content requests), the scores may be updated after the batch of observations have been processed. The adaptive recommendation engine 102 may be configured to select the contextual model with the highest posterior predictive probability. It should be appreciated that posterior predictive probabilities may be utilized as a selection criteria herein, but that a different selection criteria may be utilized to select a contextual model that most likely corresponds to the contextual data. When the selected contextual model is the short-term contextual model 106, the adaptive recommendation engine may cause a new contextual model to be generated and may initialize the new contextual model with the parameters and data associated with the short-term contextual model 106. When the selected contextual model is one of the contextual model(s) 108, the selected model may be used to provide a content recommendation. By way of example short-term contextual model 118 (e.g., the same short-term contextual model 106), contextual model 120 corresponding to a first stationary period of a reward function, and contextual model 122 corresponding to a different stationary period of the reward function may each be assigned scores based on the posterior predictive probability that the contextual data 114 corresponds to a stationary period associated with each model. For example, contextual model 118 may be assigned a score indicating a 20% probability that contextual data 114 corresponds to its stationary period, contextual model 120 may be assigned a score indicating a 10% probability that the contextual data 114 corresponds to its stationary period, and the contextual model 122 may be assigned a score indicating a 60% probability that the contextual data 114 corresponds to its stationary period. Accordingly, the contextual model 122 may be selected from among the models based on its score.

At 124, the selected model (e.g., contextual model 122) may be utilized to select an action to be performed. By way of example, the contextual model 122 can utilize the contextual data 114 to identify a content recommendation 126. The adaptive recommendation engine 102 may respond to the content request 112 with the content recommendation 126 to cause the content recommendation 126 (e.g., a recommendation of a particular musical album and/or song track) to be displayed at the web page 128 (e.g., the webpage from which the content request 112 was initiated).

At 130, the adaptive recommendation engine 102 may monitor for a reward incurred as a result of the action (e.g., providing the content recommendation 124 at web page 128). For example, the adaptive recommendation engine 102 may monitor clickstream data 132 (e.g., data indicating actions taken by the user such making a selection corresponding to the content recommendation 124 posted at web page 128). The adaptive recommendation engine 102 may be configured to identify a particular reward value when, based at least in part on the clickstream data 132, it is determined that the user clicked on the content recommendation 124. The adaptive recommendation engine 102 may be configured to identify a different reward value when, based at least in part on the clickstream data 132, it is determined that the user did not click on the content recommendation 124.

At 134, the selected model may be updated based at least in part on the observation (e.g., the combination of the contextual data 114, the content recommendation 126, and the clickstream data 132 indicating selection/no selection). The contextual model 118 (e.g., the short-term contextual model 106) may be updated regardless of whether it was the model selected. Thus, in the ongoing example, both the contextual model 122 and the contextual model 118 (e.g., the short-term contextual model 106) may be updated with the observation.

It should be appreciated that the operations of flow 100 may be repeated any suitable number of times. In some examples, the operations of 104-134 may be repeatedly executed for each observations of a batch of observations.

FIG. 2-7 illustrate a number of algorithms (e.g., procedures) related to selecting content based at least in part on contextual data of a seasonal environment, in accordance with at least one embodiments.

The algorithms disclosed herein are direct to non-stationary reward functions with seasonality. In particular, the focus is on settings where the reward function abruptly changes, shifting to a brand new one or reverting to an already observed configuration. It can be assumed that both the number of points in which the reward function changes (also referred to as "change points") and the number of unique reward functions are unknown. For time t there is a set of possible actions to choose from $A_t=[x_1(t),\ldots,x_n(t)]$. In a music recommender system for example, an action could correspond to a track to be proposed to the user. Each action is represented by a contextualized action vector $x_i(t) \in R_d$ which contains information about the context at time t and about the action i, which in the music recommendation example can incorporate information about the user, the device, music genre of the track, etc. The aim of a algorithms discussed herein, as a whole, is to choose the action which maximizes the expected reward in a sequential fashion. In the "seasonal setting," the reward function that the bandits try to learn is not unique but changes over time. Given a sequence of steps from 1 to T, there are a number of so-called stationary periods $S=\{S_0, \ldots, S_C\}$ in which a single reward function is used, where C is the number of changes that occur determining stationary periods as a set of consecutive steps. We assume that C<<T and the change points to be unknown to the learner, which therefore has to detect the change points in order to quickly react, learning the parameters of the new reward function or selecting the appropriate one among the ones which it has previously learned. A linear structure in the function of the reward is as follows:

$$r_t(x_i(t))= \langle \theta^*, x_i(t) \rangle + \epsilon_t$$

where $\theta^* \in R^d$ is the parameter of interest. The perturbations may be sampled from independent Gaussian distributions $\epsilon_t \stackrel{iid}{\sim} N(0,\sigma^2)$.

Under the seasonal assumption described above, the true value of the parameter $\theta^*$ is not constant over time, but it is selected from the set $\Theta=\{\theta_1, \ldots, \theta_k\}$ and each of the stationary periods is associated with a unique value of $\theta$ called $\theta_s^*$. It is also to be noted that in practice most often k<<C.

FIG. 2 illustrates an example procedure 200 for processing a batch of content requests. In the procedure 200, any suitable number of content requests (b) may be processed as part of a batch (B) of observations.

At line 1, various parameters of the procedure 200 may be initialized. By way of example, $\lambda$, $\tau$, $N_{MAX}$, which can correspond to input parameters provided to the procedure 200 may be initialized. In some embodiments, $\lambda$ may be a regularization parameter which depends on the bandit prototype used for the contextual bandit and short-term contextual bandit instances; $\tau$ may tune the short-term memory of the short-term contextual bandit model; $N_{MAX}$ may be the maximum number of base bandits the learner is configured to maintain.

At line 2, a short-term contextual bandit model, S, and a contextual bandit model (CBM), $L_1$, may be initialized. In some embodiments, initializing short-term contextual bandit model S may include executing the procedure 300 of FIG. 3. FIG. 3 illustrates an example procedure 300 for initializing a number of parameters of a contextual bandit model. In some embodiments, the short-term contextual bandit may be a sliding-window bandit instance or a discounted. The former being configured to update the reward parameter estimator by considering a fixed number of past observations, while the latter discounts the past observations with exponentially decreasing weights, with the advantage that there is no need to store a sliding window of records to perform the update of the estimator. Thus, in some embodiments, the parameter $\tau$ could be the window size or the discount factor if the shadow bandit is a sliding-window or discounted bandit instance, respectively.

In some embodiments, the contextual bandits (each of the CBMs of β) may be linear Thompson Sampling (linTS) bandits. A linear Thompson Sampling bandit implements a policy (e.g., a mapping of input, such as a context, to an output, such as a reward) which assumes the underlying relationship between rewards and contexts are linear. These models may be utilized in order to have analytical form of the posterior distribution of the reward parameter. A Gaussian prior may be placed on the parameter of interest and it may be assumed that the reward likelihood is Gaussian.

$$\theta \sim N(0_d, \lambda^{-1} 1_d)$$

$$r_t | \theta, x \sim N(\langle \theta, x \rangle, \sigma^2)$$

Denoting by $Dt = \{(x_s, r_s)\}_{s=1:t}$ the history of chosen actions $x_s$ and corresponding observed rewards $r_s$ up to time t, the posterior distribution with precision matrix:

$$M = \lambda 1_d + \Sigma_{s=1}^{t} x_s x_s^t$$

and mean vector:

$$\mu = M^{-1} \Sigma_{s-1}^{t} r_s x_s$$

The posterior predictive distribution of the observed reward at time t given the previous observations may be Gaussian distributed as well and provided by:

$$r_t | x_t, D_{t-1} \sim N(\langle \mu, x \rangle, \tau^2 + x_t M^{-1} x_t^T)$$

with μ and M being the mean vector and precision matrix of the posterior distribution of $\theta | D_{t-1}$ respectively. Thus, procedure 300 may initialize the parameters M, μ, and b.

Returning FIG. 2, the set of CBMs β is set to the set of contextual bandit models (currently, just $L_1$) and a variable tracking the number of CBMs ($N_L$) may be set to the value of 1. In some embodiments, weights associated with S and $L_1$ may be set to 0.5.

At line 3, a for loop may begin which can be repeated for every observation b in batch B may be the number of batches. With this loop, procedure 200 illustrates a batch version of the proposed algorithm, but it should be appreciated that procedure 200 can be executed in other settings in which one observation at a time is considered rather than in batch. When processing a batch, a set $I_j$ may be initialized to an empty set (∅). At line 5, a loop may begin which can be repeated for every instance t in observation b.

At line 6, a bandit j is selected from the set of available bandits β and the short-term CBM S with probabilities proportional to the weights $\omega_j$. That is, the bandit j may be selected from β or S based at least in part on having a highest weight. If the weights of the CBM Li and the CBM S are equal, the CBM $L_1$ may be selected as bandit j.

At line 7, the set $I_j$ may be updated to indicate each model selected j at each step (e.g., each index). The set of indices $I_j$ could be used to identify, at a later time, each model selected at a given index so that the observation (e.g., the action provided and reward identified at that time step) may be used to update the model.

At line 8, the procedure 400 of FIG. 4 may be executed to cause the select bandit to "play," or said another way, the selected bandit may be utilized to select an action to be taken. FIG. 4 illustrates an example procedure 400 for utilizing a contextual bandit model to identify an action. Upon conclusion of executing procedure 400, an action $x_t$ may be returned to procedure 200. In a music service context, the action $x_t$ may correspond to a music recommendation of an album or track. The action $x_t$ (e.g., a music recommendation) may be provided to the user and clickstream data may be obtained subsequent to the action being provided.

Returning to FIG. 2, at line 9, procedure may monitor reward $r_t$. By way of example, clickstream data (e.g., clickstream data 132 of FIG. 1) may be obtained which indicates whether the action $x_t$ was selected or not selected. The for loop at line 5 may end at line 10.

At line 11, if the CBM S was selected at least once in the batch (e.g., at line 6), then a number of CBMs ($N_L$) may be incremented at line 12, a new long-term memory instance CBM (e.g., $L_2$) may be created and initialized with the parameters of the CBM S at line 14, and at line 14, the set of CBMs fi may be updated to include the previous set of CBMs β and the newly created CBM $L_2$.

At line 16, the CBM S is updated with the last τ observation. The operation of line 16 is executed regardless of which CBM has played at line 8. The operation of line 16 may include executing the procedure 500 of FIG. 5. FIG. 5 illustrates an example procedure 500 for updating a contextual bandit model.

At line 17 of procedure 200, a for loop may begin which executes line 18 of procedure 200 for each CBM in β. Line 18 of procedure 200 may include executing the procedure 500 of FIG. 5 to update the selected CBM $L_j$ with the action and reward pair from a given index s, where s is in the set of indices $I_j$. This may include updated the set of observations assigned to each CBM from the batch B. While procedure 200 illustrates this update occurring for each observation, each iteration through the loop started at line 3, it should be appreciated that, in some embodiments, the batch B of observations may be alternatively assigned to a single contextual model upon completion of the procedure 200. That is, in some embodiments, a contextual model may be selected based on the posterior predictive probability that a last observation corresponds to the model. The selected contextual model may then be updated with all of the observations for each time step of the batch B, regardless of which particular contextual model was utilized for each prediction in the batch. As updating the model with one or more observations can be extensive, the latter approach may offer performance improvements over updating a selected model for each observation as part of the loop of line 3. At line 19 of procedure 200, the for loop of line 17 may end.

At line 20, if the number of CBM in β exceeds the maximum number $N_{MAX}$, a pruning scheme is called at line 21 to discard one of them. Allowing the procedure 200 to create an unbounded number of CBMs could lead to computational issues, both in terms of memory and time. As a matter of fact, outliers might trigger false change point detections which would imply the creation of additional long-term memory bandits (e.g., CBMs) targeting stationary configurations which had already been learned by another long-term memory bandit previously created. The problem of having spurious CBMs can be addressed by imposing the maximum number of long-term memory instances we are willing to maintain ($N_{MAX}$). This number can be chosen using some prior information about the number of unique stationary configurations $|\Theta|$.

Having multiple CBMs learning the same stationary period would result in a slow convergence of their estimators since they get updated less frequently. In order to satisfy the constraint, the algorithm includes a strategy to prune the least useful CBM whenever the maximum allowed number is exceeded. For example, the procedure 600 of FIG. 6 may be executed. FIG. 6 illustrates an example procedure 600 for pruning a set of contextual bandit models.

Procedure 600 may implement two different pruning schemes to control the number of available bandits at each time step. The rationale behind both schemes is to find the pair of closest bandits, and among the two, discard the one which is less certain about its estimate, measured with the trace of the associated posterior covariance matrix. A quick way to find the pair of closest bandits would be to compare the pairwise distances between the posterior mean parameters of the base bandits, resulting in a time complexity of $O(N^s_{MAX}d)$. However, this would not take into account the whole distribution associated to each CBM. Therefore an alternative approach, used that can include comparing the symmetric Kullback-Leibler divergence between pairs of CBMs. The symmetric Kullback-Leibler divergence between two measures p and q is defined as:

$$KL_{sym}(p,q) = KL(p,q) + KL(q,P)$$

And it can be computed in closed form if the distributions of interest are Gaussian:

$$KL_{sym}\left(\mathcal{N}\left(\mu_1, \sum_1\right), \mathcal{N}\left(\mu_1, \sum_2\right)\right) =$$

$$\frac{1}{2}tr\left(\sum_2^{-1}\sum_1 + \sum_1^{-1}\sum_2\right) + \frac{1}{2}(\mu_2 - \mu_1)^T \sum_2^{-1}(\mu_2 - \mu_1) + (\mu_2 - \mu_1)^T \sum_1^{-1}(\mu_2 - \mu_1)$$

The time complexity of this scheme is $O(N^2_{MAX}d^3)$.

In some embodiments, a CBM may be pruned from the set based at least in part on it being assigned the latest observations and/or a time elapsed since the model was last used.

Before starting a new batch, the weights of each CBM are computed at line 23 of procedure 200. By way of example, the procedure 700 of FIG. 7 may be executed. FIG. 7 illustrates an example procedure 700 for updating weights associated with a set of contextual bandit models (e.g., the set including β and S). The weighting strategy of procedure 700 is illustrative in nature and any suitable weighting strategy may be utilized. The weights assigned to each bandit should reflect the likelihood of describing the last observation. Any contextual bandit algorithm which can provide such scores can be used as prototype instance for the CBMs and short-term CBM of the proposed scheme. In the Bayesian framework, such weights are naturally provided by the posterior predictive probabilities of the observation under each bandit. The changes in the reward function are detected by looking at the posterior predictive probabilities of the last observed reward. In the case the rewards are observed in batches, the scores assigned to each bandit take into account all the records in the last batch. Denoting by $p_j(r_t,x_t)$ the posterior predictive probability that the bandit j gives to the reward rt, given the action $x_t$, we have that the weight assigned to the bandit after collecting a batch b of observations is:

$$\omega_j = \prod_{t \in b} p_j(r_t \mid x_t)$$

The weights for each CBM may be updated in this manner. And procedure 200 may proceed back to line 3 for the next observation in the batch. In this next iteration, the selection step of line 6, the algorithm samples the reward parameter estimate B from the mixture of posterior distributions provided by the available bandits, with the weights being the predictive posterior probabilities assigned by procedure 700.

Figure 8:
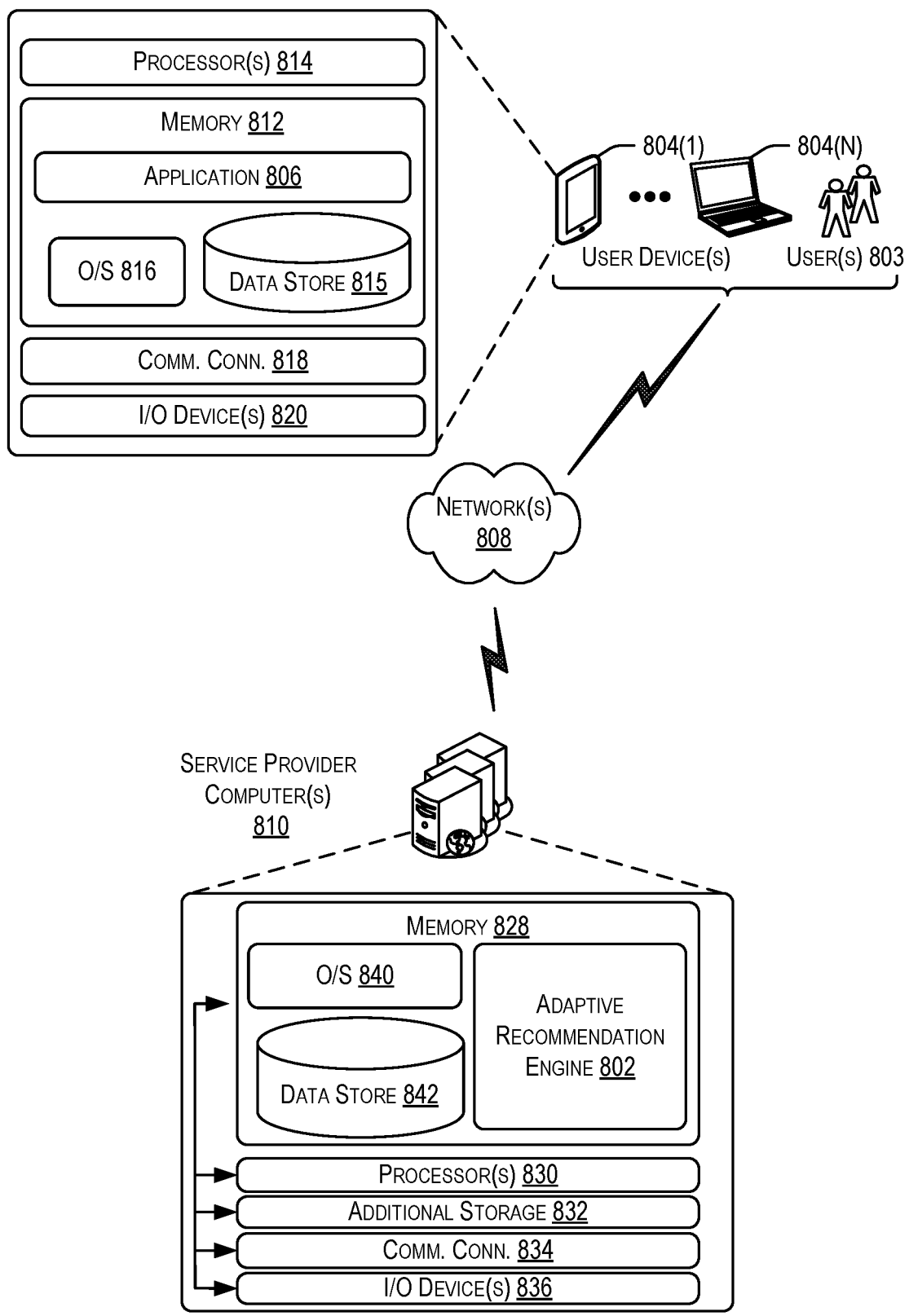
FIG. 8 illustrates example components of an adaptive recommendation system, in accordance with at least one embodiment.

FIG. 8 illustrates components of an adaptive recommendation system 800 according to a particular embodiment. In adaptive recommendation system 800, one or more user(s) 803 may utilize a user device (e.g., a user device of a collection of user device(s) 804) to provide input to the service provider computer(s) 810. For example, the user may access any suitable input/output devices (e.g., I/O devices 820 discussed below) such as a keyboard, a microphone, and the like, to provide input (e.g., via an application 806 running on the user device(s) 804) to service provider computer(s) 810 via one or more network(s) 808. In some aspects, the application 806 (e.g., a web browser application) operating on the user device(s) 804 may be hosted, managed, and/or provided by a computing service or service provider, such as by utilizing one or more service provider computer(s) 810.

In some examples, the network(s) 808 may include any one or a combination of many different types of networks, such as cable networks, the Internet, wireless networks, cellular networks, and other private and/or public networks. While the illustrated example represents the user(s) 803 accessing application functionality over the network(s) 808, the described techniques may equally apply in instances where the user(s) 803 interact with the service provider computer(s) 810 via the one or more user device(s) 804 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the adaptive recommendation engine 802 (e.g., an example of the adaptive recommendation engines of FIGS. 1-3), discussed further below in more detail, may operate in whole or in part on the user device(s) 804. Thus, in some embodiments, the user(s) 803 may access the functionality of the adaptive recommendation engine 802 directly through the user device(s) 804 and/or the service provider computer(s) 810 via user interfaces provided by the adaptive recommendation engine 802. In some embodiments, the functionality of the adaptive recommendation engine 802 may be provided as a software service with which input (e.g., contextual data) may be submitted and output (e.g., one or more instances of content and/or a content recommendation) may be received. For example, the adaptive recommendation engine 802 may operate as part of an intelligent personal assistant service provided by the service provider computer(s) 810 which can be accessed by vocal commands provided at the user device(s) 804.

In some embodiments, the application 806 may allow the user(s) 803 to interact with the service provider computer(s)

810 so as to provide the various functionality described above with respect to the adaptive recommendation engine 802. For example, the application 806 may provide contextual data to the service provider computer(s) 810. The application 806 may be configured to transmit (electronically convey) the contextual data to the adaptive recommendation engine 802, operating at the user device(s) 803 and/or the service provider computer(s) 810. The application 806 may further be configured to receive, process, and/or present (via a display and/or speaker of the user device(s) 804 or another suitable output device) any suitable data received from the service provider computer(s) 810 (e.g., content and/or a content recommendation).

The service provider computer(s) 810, perhaps arranged in a cluster of servers or as a server farm, may host the application 806 operating on the user device(s) 804 and/or cloud-based software services. Other server architectures may also be used to host the application 806 and/or cloud-based software services. The application 806 operating on the user device(s) 804 may be capable of handling requests from the user(s) 803 and serving, in response, various user interfaces and/or output that can be presented at the user device(s) 804 (e.g., via a display and/or speaker). The application 806 operating on the user device(s) 804 can present any suitable type of website that supports user interaction, including search engine sites, item detail pages, and the like. The described techniques can similarly be implemented outside of the application 806, such as with other applications running on the user device(s) 804.

The user device(s) 804 may be any suitable type of computing device such as, but not limited to, a mobile phone, a smart speaker, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 804 may be in communication with the service provider computer(s) 810 via the network(s) 808, or via other network connections.

In one illustrative configuration, the user device(s) 804 may include at least one memory 812 and one or more processing units (or processor(s)) 814. The processor(s) 814 may be implemented as appropriate in hardware, computer-executable instructions, firmware, or combinations thereof. Computer-executable instruction or firmware implementations of the processor(s) 814 may include computer-executable or machine-executable instructions written in any suitable programming language to perform the various functions described.

The memory 812 may store program instructions that are loadable and executable on the processor(s) 814, as well as data generated during the execution of these programs. Depending on the configuration and type of user computing device, the memory 812 may be volatile (such as random access memory (RAM)) and/or non-volatile (such as read-only memory (ROM), flash memory, etc.). The user device(s) 804 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 812 may include multiple different types of memory, such as static random access memory (SRAM), dynamic random access memory (DRAM), or ROM.

Turning to the contents of the memory 812 in more detail, the memory 812 may include an operating system 816, one or more data stores 815, and one or more application programs, modules, or services for implementing the features of the adaptive recommendation engine 802 disclosed herein, provided via the application 806 (e.g., a browser application, a shopping application, a digital assistant application, etc.). The application 806 may be configured to receive, store, and/or display a network page or other interface for interacting with the service provider computer(s) 810. In some embodiments, the application 806 may be configured to present user options and/or receive user input audibly. In some embodiments, the memory 812 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 804 may also contain communications connection(s) 818 that allow the user device(s) 804 to communicate with a stored database, another computing device or server (e.g., the service provider computer(s) 810), user terminals and/or other devices on the network(s) 808. The user device(s) 804 may also include I/O device(s) 820, such as a keyboard, a mouse, a pen, a voice input device (e.g., a microphone), a touch input device, a display, speakers, a printer, etc.

In some aspects, the service provider computer(s) 810 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. Additionally, it should be noted that in some embodiments, the service provider computer(s) 810 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 810 may be in communication with the user device(s) 804 and/or other service providers via the network(s) 808 or via other network connections. The service provider computer(s) 810 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 810 may include at least one memory 828 and one or more processing units (or processor(s)) 830. The processor(s) 830 may be implemented as appropriate in hardware, computer-executable instructions, firmware, or combinations thereof. Computer-executable instruction or firmware implementations of the processor(s) 830 may include computer-executable or machine-executable instructions written in any suitable programming language to perform the various functions described.

The memory 828 may store program instructions that are loadable and executable on the processor(s) 830, as well as data generated during the execution of these programs. Depending on the configuration and type of service provider computer(s) 810, the memory 828 may be volatile (such as RAM) and/or non-volatile (such as ROM, flash memory, etc.). The service provider computer(s) 810 or servers may also include additional storage 832, which may include removable storage and/or non-removable storage. The additional storage 832 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 828 may include multiple different types of memory, such as SRAM, DRAM, or ROM.

The memory 828, the additional storage 832, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 828 and the additional storage 832 are all examples of computer storage media. Additional types of computer storage media that may be present in the service provider computer(s) 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 810. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 810 may also contain communications connection(s) 834 that allow the service provider computer(s) 810 to communicate with a stored database, another computing device or server, user terminals and/or other devices on the network(s) 808. The service provider computer(s) 810 may also include I/O device(s) 836, such as a keyboard, a mouse, a pen, a voice input device, a touch input device, a display, speakers, a printer, etc.

Turning to the contents of the memory 828 in more detail, the memory 828 may include an operating system 840, one or more data stores 842, and/or one or more application programs, modules, or services for implementing the features disclosed herein, such as the features provided by the adaptive recommendation engine 802.

Figure 9:
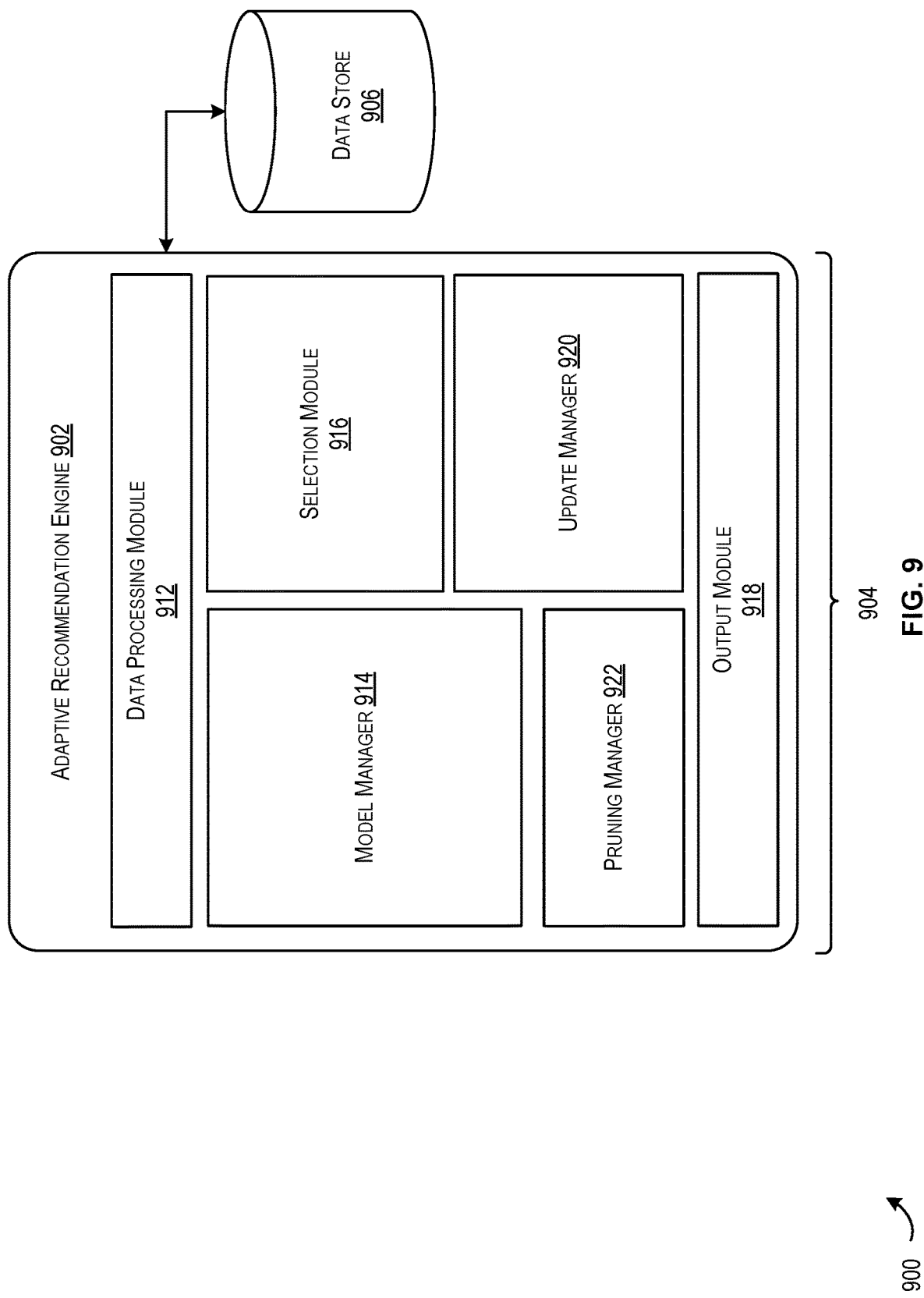
FIG. 9 is a schematic diagram of an example computer architecture for the adaptive recommendation engine, including a plurality of modules that may perform functions in accordance with at least one embodiment.

FIG. 9 is a schematic diagram of an example computer architecture 900 for the adaptive recommendation engine 902 (e.g., an example of the adaptive recommendation engine 902 of FIG. 1), including a plurality of modules 904 that may perform functions in accordance with at least one embodiment. The modules 904 may be software modules, hardware modules, or a combination thereof. If the modules 904 are software modules, the modules 904 can be embodied on a computer readable medium and processed by a processor in any of the computer systems described herein. It should be noted that any module or data store described herein, may be, in some embodiments, be a service responsible for managing data of the type required to make corresponding calculations. The modules 904, or some portion of the modules 904, may be operate at the service provider computer(s) 810 of FIG. 8, or the modules may operate as separate modules or services external to the service provider computer(s) 810 (e.g., as part of the application 806 of FIG. 8 operating on the user device(s) 804 of FIG. 8).

In the embodiment shown in the FIG. 9, a data store 906 is shown, although data can be maintained, derived, or otherwise accessed from various data stores, either remote or local to the adaptive recommendation engine 902, to achieve the functions described herein. In at least one embodiment, the data store described herein may be physically located on the user device(s) 804 or alternatively, any suitable combination of the data stores may be operated as part of the service provider computer(s) 810, for example, as part of the adaptive recommendation engine 902. The adaptive recommendation engine 902, as shown in FIG. 9, includes various modules such as a data processing module 912, a model manager 914, a selection module 916, an output module 918, an update manager 920, and a pruning manager 922. Some functions of the modules 904 are described below. However, for the benefit of the reader, a brief, non-limiting description of each of the modules is provided in the following paragraphs.

In at least one embodiment, the adaptive recommendation engine 902 includes the data processing module 912. Generally, the data processing module 912 may be utilized to receive any suitable information with respect to any example provided herein. By way of example, the data processing module 912 may receive a content request including contextual data (e.g., user data, device data, etc.). The data processing module 912 may further be configured to receive clickstream data associated with an action (e.g., a content recommendation provided by the output module 918). The data processing module 912 may include any suitable number of application programming interfaces with which the functionality of the adaptive recommendation engine 902 may be invoked. In some embodiments, the data processing module 912 may be configured to execute procedure 200 of FIG. 2. Additionally, the data processing module 912 may be configured to invoke the functionality provided by the model manager 914, the selection module 916, the output module 918, the update manager 920, and the pruning manager 922.

In some embodiments, the model manager 914 may be a part of the data processing module 912 or a separate module. In some embodiments, the model manager 914 may be configured to generate one or more contextual bandit models in conformance with the operations described above in procedure 200 of FIG. 2. In some embodiments, the model manager 914 may be configured to execute the operations of procedure 300 of FIG. 3 to initialize one or more parameters of one or more contextual bandit models (CBMs and/or S of FIG. 2).

The adaptive recommendation engine 902 may include selection module 916. In some embodiments, the selection module 916 may be configured to execute the operations of line 6-8 of procedure 200 and procedure 600 of FIG. 6. The selection module 916 can perform any suitable operations for selecting a CBM from which a recommendation may be solicited. The recommendation provided by the selected CBM (in response to executing procedure 600) may be provided to the output module 918 for output.

The output module 924 may be configured to generate output (e.g., a content recommendation received from the selection module 916) to be provided at a user device in response to received content request. Subsequent to this output being provided, clickstream data indicating a reward (e.g., either the user selected the content recommendation or they did not select the content recommendation) may be received by the data processing module 912 as part of the operations of line 9 of procedure 200.

The update manager 920 may be configured to perform the operations of procedure 500 of FIG. 5. In some embodiments, the functionality of the update manager 920 may be invoked by the data processing module 912. By way of example, the data processing module 912 may execute the operations of the update manager 920 at lines 16 and 18 of procedure 200.

The pruning manager 922 may be configured to perform the operations of procedure 700 of FIG. 7. In some embodiments, the functionality of the pruning manager 922 may be invoked by the data processing module 912. By way of example, the data processing module 912 may execute the operations of the pruning manager 922 at line 21 procedure 200.

Figure 10:
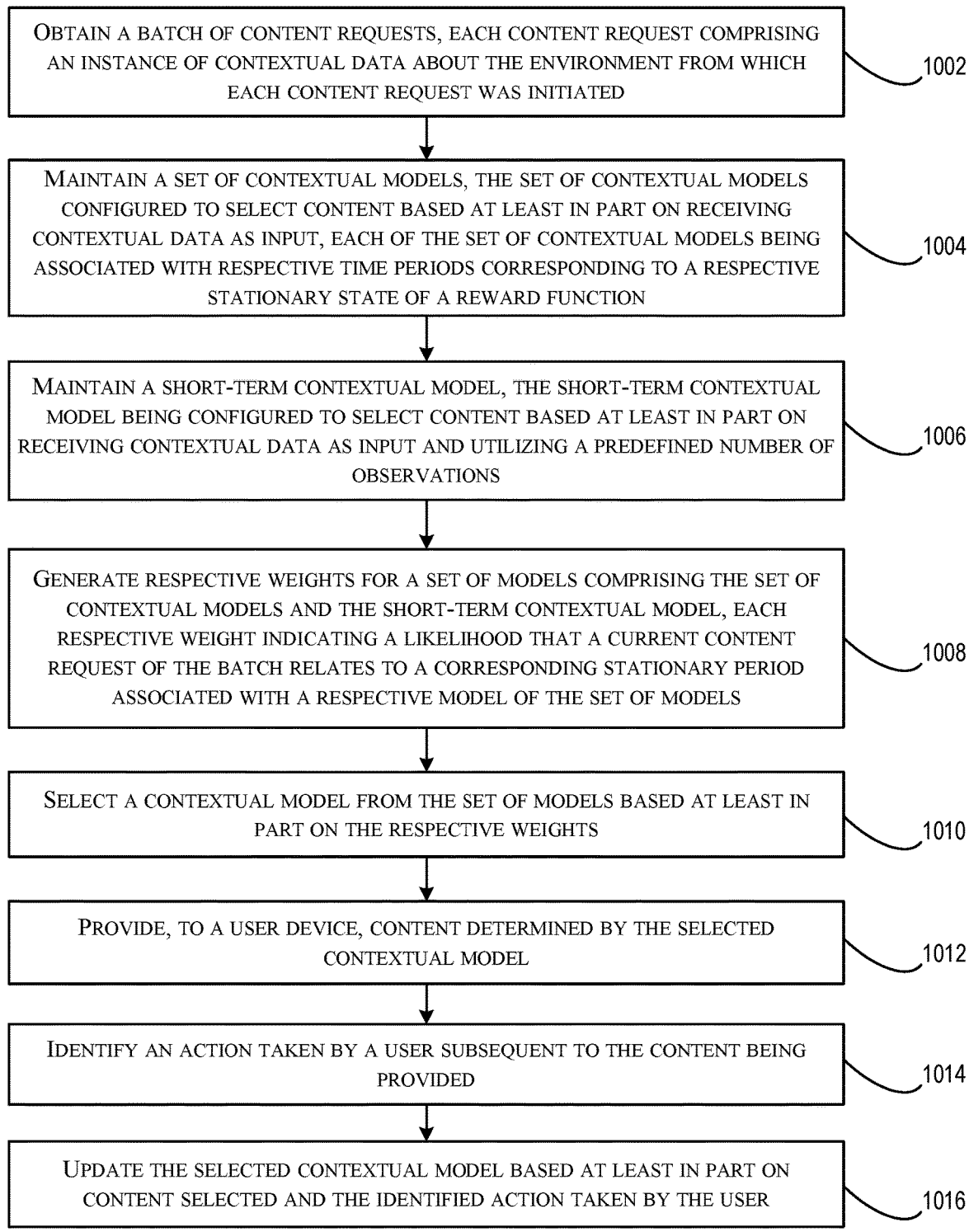
FIG. 10 includes a flowchart illustrating an example method for adaptively selecting content based at least in part on contextual data, in accordance with at least one embodiment.

FIG. 10 is a flowchart illustrating an example method 1000 for generating a shortened title for an item utilizing an adaptive recommendation engine (e.g., the adaptive recommendation engines of FIGS. 1-3, 9, and 10), in accordance with at least one embodiment. A computer-readable medium may store computer-executable instructions that, when executed by at least one processor, cause at least one computer to perform instructions comprising the operations of the method 1000. It should be appreciated that the operations of the method 1000 may be performed in any suitable, not necessarily the order depicted in FIG. 10. Further, the method 1000 may include additional, or fewer operations than those depicted in FIG. 10. The operations of method 1000 may be performed by a computing system (e.g., the adaptive recommendation system 800) comprising the adaptive recommendation engine 902 of FIG. 9 which may operate in whole or in part on a user device (e.g., one or more of the user device(s) 804 of FIG. 8) and/or the service provider computer(s) 810 of FIG. 8.

The method 1000 may begin at block 1002, where a batch of content requests may be obtained (e.g., by the data processing module 912 of FIG. 9). In some embodiments, each content request comprises an instance of contextual data (e.g., contextual data 114 of FIG. 1) about the environment from which each content request was initiated.

At block 1004, a set of contextual models may be maintained (e.g., by the model manager 914 of FIG. 9). In some embodiments, the set of contextual models (e.g., the contextual models 106 of FIG. 1) may be configured to select content based at least in part on receiving contextual data as input. Each of the set of contextual models may be associated with respective time periods corresponding to a respective stationary state of a reward function.

At block 1006, a short-term contextual model may be maintained (e.g., by the model manager 914 of FIG. 9). In some embodiments, the short-term contextual model may be configured to select content based at least in part on receiving contextual data as input and utilizing a predefined number of observations.

The operations of blocks 1008-1016 may be executed for each content request of the batch.

At block 1008, respective weights may be generated (e.g., by the selection module 916 of FIG. 9) for a set of models comprising the set of contextual models and the short-term contextual model. Each respective weight may indicate a likelihood that a current content request of the batch relates to a corresponding stationary period associated with a respective model of the set of models.

At block 1010, a contextual model may be selected (e.g., by the selection module 916) from the set of models based at least in part on the respective weights.

At block 1012, in accordance with the contextual model selected being one of the set of contextual models, content determined by the selected contextual model may be provided (e.g., by the output module 918 of FIG. 9) to a user device.

At block 1014, an action taken by a user (e.g., the user selected the content or did not select the content) subsequent to the content being provided may be identified (e.g., by the data processing module 912).

At block 1016, the selected contextual model may be updated (e.g., by the update manager 920 of FIG. 9) based at least in part on content selected and the identified action taken by the user.

Figure 11:
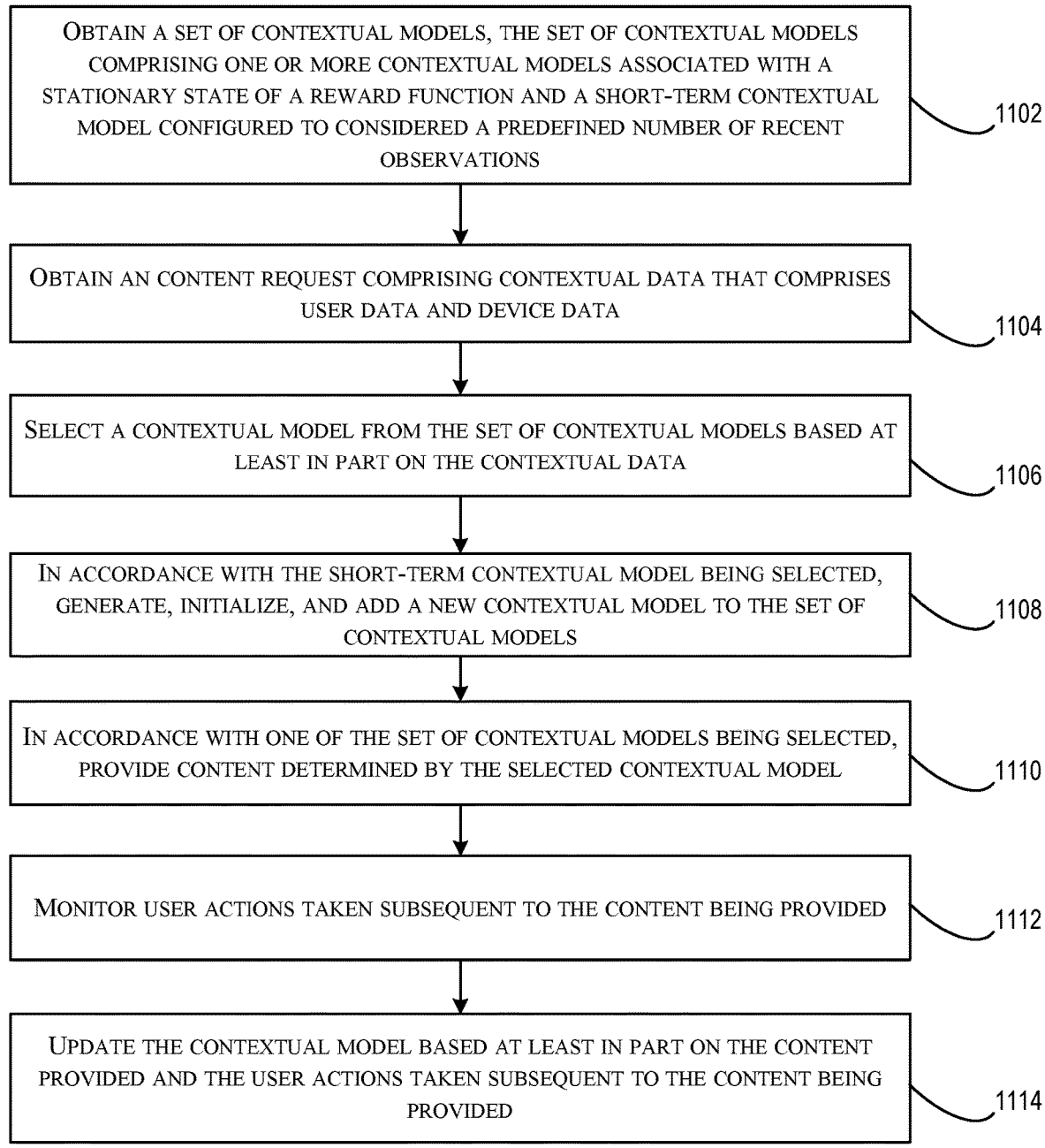
FIG. 11 includes another flowchart illustrating another example method for adaptively selecting content based at least in part on contextual data, in accordance with at least one embodiment.

FIG. 11 is another flowchart illustrating another example method 1100 for generating a shortened title for an item utilizing an adaptive recommendation engine (e.g., the adaptive recommendation engines of FIGS. 1-3, 9, and 10), in accordance with at least one embodiment. A computer-readable medium may store computer-executable instructions that, when executed by at least one processor, cause at least one computer to perform instructions comprising the operations of the method 1100. It should be appreciated that the operations of the method 1100 may be performed in any suitable, not necessarily the order depicted in FIG. 11. Further, the method 1100 may include additional, or fewer operations than those depicted in FIG. 11. The operations of method 1100 may be performed by any suitable combination of the modules 904 of the adaptive recommendation engine 902 of FIG. 9 which may operate in whole or in part on a user device (e.g., one or more of the user device(s) 804 of FIG. 8) and/or the service provider computer(s) 810 of FIG. 8. As a non-limiting example, the method 1100 may be performed by a computing device (e.g., the service provider computer(s) 810) having one or more processors and a memory storing executable instructions that, upon execution by the one or more processors, cause the computing device to perform at least the operations of method 1100.

The method 1100 may begin at block 1102, a set of contextual models may be obtained (e.g., by the model manager 914 of FIG. 9). In some embodiments, the set of contextual models comprising one or more contextual models associated with a stationary state of a reward function and a short-term contextual model configured to considered a predefined number of recent observations.

At block 1104, a content request may be obtained (e.g., by the data processing module 912, of FIG. 9), the content request may comprise contextual data that comprises user data and device data.

At block 1106, a contextual model may be selected (e.g., by the selection module 916 of FIG. 9) from the set of contextual models. In some embodiments, the contextual model may be selected based at least in part on contextual data. That is, a posterior predictive probability that the contextual data relates to a stationary state corresponding to each contextual model may be calculated and a model having a highest posterior predictive probability may be selected.

At block 1108, in accordance with the short-term contextual model being selected, a new contextual model may be added (e.g., by the model manager 914 of FIG. 9) to the set of contextual models.

At block 1110, in accordance with one of the set of contextual models being selected, content may be provided (e.g., by the output module 918 of FIG. 9), the content being determined by the selected contextual model.

At block 1112, user actions taken subsequent to the content being provided may be monitored (e.g., by the data processing module 912). By way of example, the data processing module 912 may obtain clickstream data and may monitor for actions (e.g., the user selecting the content) for a period of time after the content was provided.

At block 1114, the contextual model may be updated (e.g., by the update manager 920 of FIG. 9) based at least in part on the content provided and the user actions taken subsequent to the content being provided.

Figure 12:
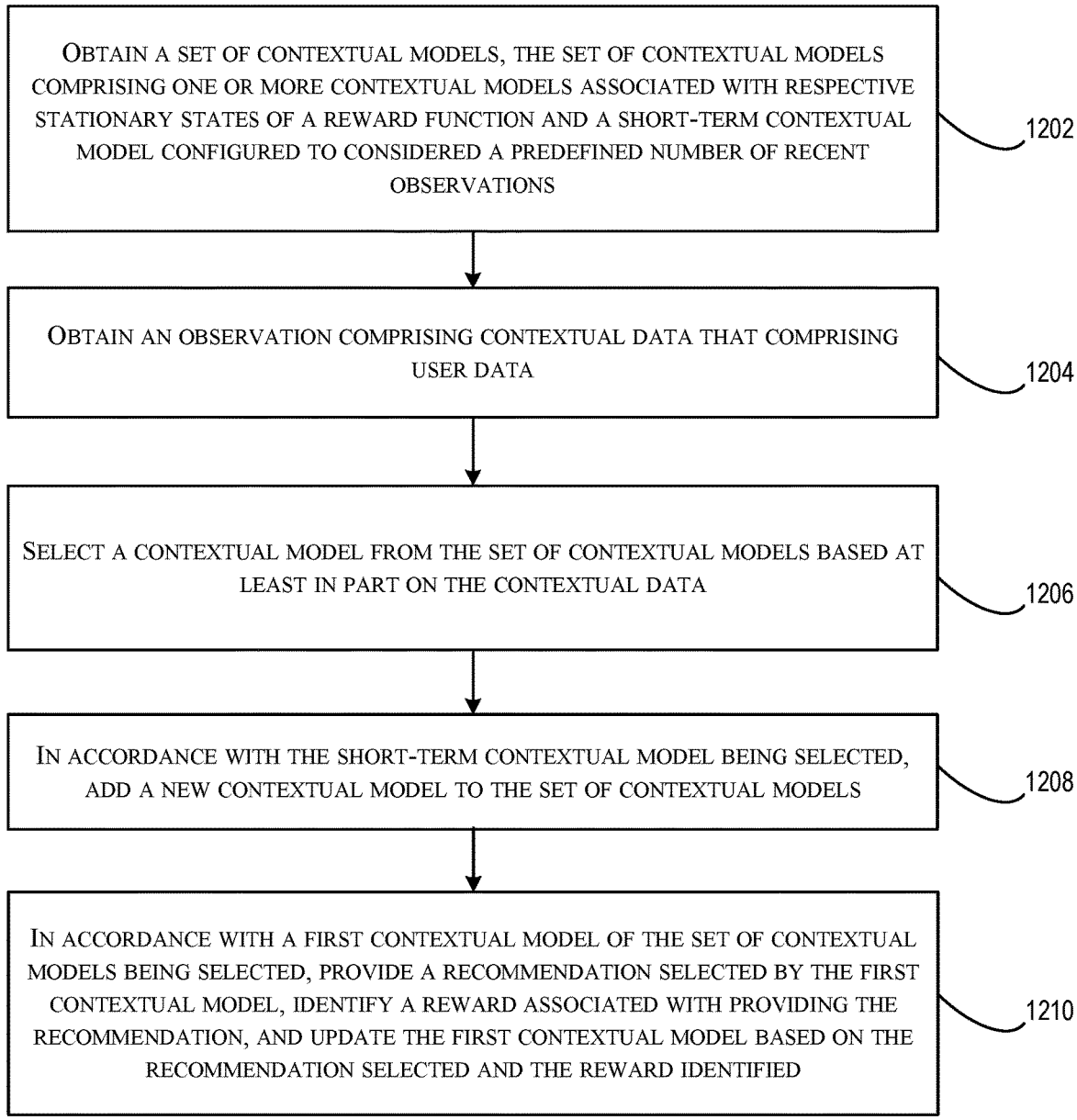
FIG. 12 includes yet another flowchart illustrating yet another example method adaptively selecting content based at least in part on contextual data, in accordance with at least one embodiment.

FIG. 12 is yet another flowchart illustrating yet another example method 1200 for generating a shortened title for an item utilizing the adaptive recommendation engine (e.g., the adaptive recommendation engines of FIGS. 1-3, 9, and 10), in accordance with at least one embodiment. A computer-readable medium may store computer-executable instructions that, when executed by at least one processor, cause at least one computer to perform instructions comprising the operations of the method 1200. It should be appreciated that the operations of the method 1200 may be performed in any suitable, not necessarily the order depicted in FIG. 12. Further, the method 1200 may include additional, or fewer operations than those depicted in FIG. 12. The operations of method 1200 may be performed by any suitable combination of the modules 904 of the adaptive recommendation engine 902 which may operate in whole or in part on a user device (e.g., one or more of the user device(s) 804 of FIG. 8) and/or the service provider computer(s) 810 of FIG. 8.

The method 1200 may begin at 1202, where a set of contextual models may be obtained (e.g., by the model manager 914 of FIG. 9). In some embodiments, the set of contextual models may comprise one or more contextual models associated with respective stationary states of a reward function and a short-term contextual model configured to considered a predefined number of recent observations.

At block 1204, an observation (e.g., a content request 112 of FIG. 1) may be obtained (e.g., by the data processing module 912 of FIG. 9). In some embodiments, the observations may comprise contextual data (e.g., contextual data 114 of FIG. 1) that comprising user data.

At block 1206, a contextual model may be selected (e.g., by the selection module 916 of FIG. 9) from the set of contextual models based at least in part on the contextual data.

At block 1208 in accordance with the short-term contextual model being selected, a new contextual model may be added (e.g., by the model manager 914 of FIG. 9) to the set of contextual models.

At block 1210, in accordance with a particular contextual model of the set of contextual models being selected, a recommendation may be provided (e.g., by the output module 918 of FIG. 9). In some embodiments, the recommendation is selected by the particular contextual model. A reward associated with providing the recommendation may be identified (e.g., by the data processing module 912 of FIG. 9) and the particular contextual model may be updated (e.g., by the update manager 920 of FIG. 9) based on the recommendation selected and the reward identified.

Figure 13:
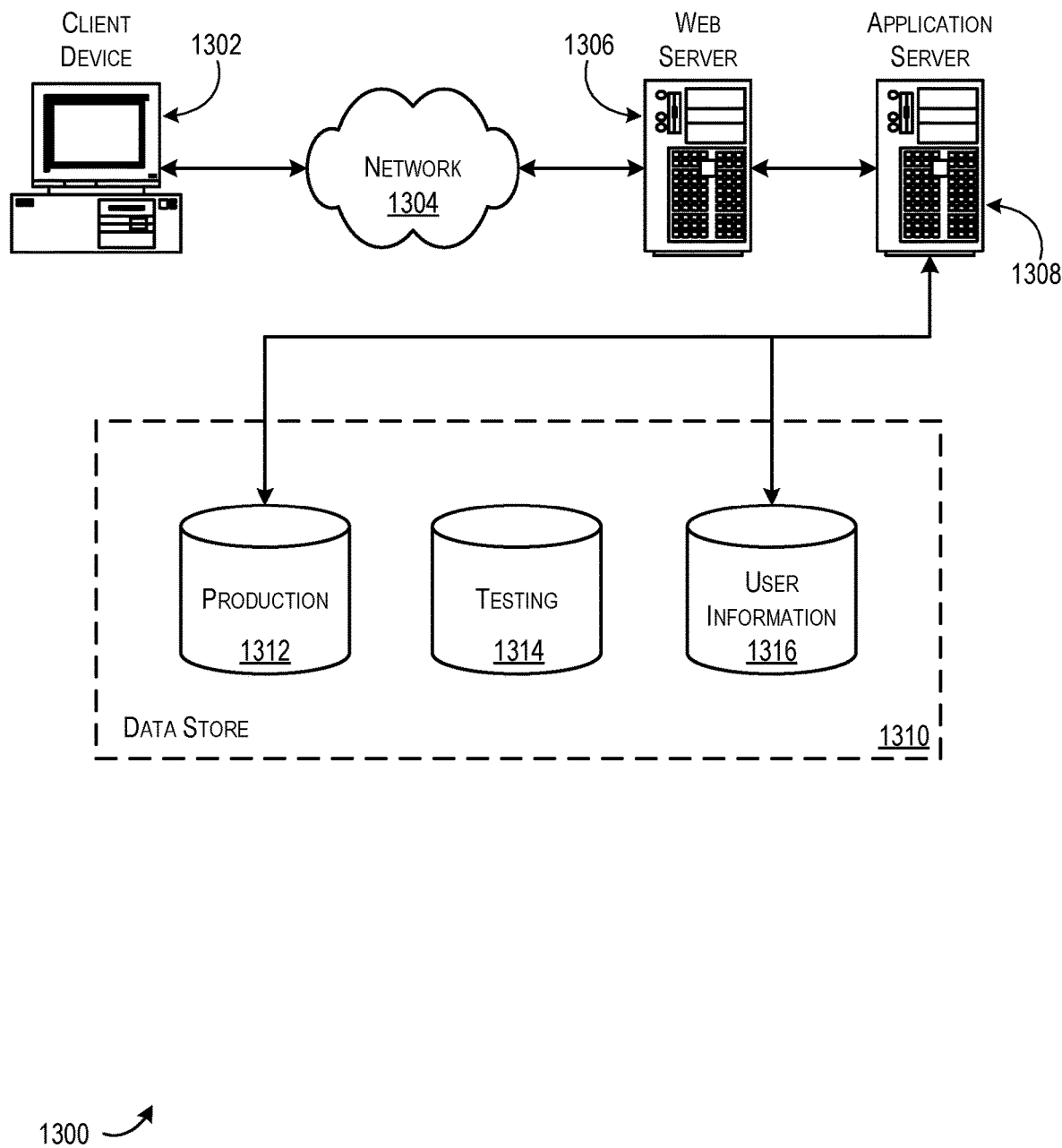
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes a user device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a set of contextual models, the set of contextual models comprising one or more contextual models associated with respective stationary states of a reward function and a short-term contextual model configured to consider a predefined number of recent observations;
   obtaining an observation comprising contextual data that comprises user data;
   selecting a contextual model from the set of contextual models based at least in part on the contextual data;
   in accordance with the short-term contextual model being selected, adding a new contextual model to the set of contextual models; and
   in accordance with a particular contextual model of the set of contextual models being selected, providing a recommendation selected by the particular contextual model, identify a reward associated with providing the recommendation, and update the particular contextual model based on the recommendation selected and the reward identified.

2. The computer-implemented method of claim 1, wherein the new contextual model is generated with parameters associated with the short-term contextual model.

3. The computer-implemented method of claim 1, further comprising, in accordance with the short-term contextual model being selected:
   identifying a number of contextual models in the set of contextual models; and
   in response to determining that the number of contextual models in the set of contextual models exceeds a predefined threshold number, executing a pruning scheme to discard a specific contextual model of the set of contextual models.

4. The computer-implemented method of claim 3, wherein executing the pruning scheme selects the specific contextual model for discarding from the set of contextual models based at least in part on i) a time period associated with observations utilized by the specific contextual model or ii) a time elapsed since the specific contextual model was last selected.

5. The computer-implemented method of claim 1, further comprising generating respective weights for the set of contextual models, each respective weight indicating a likelihood that the observation relates to a corresponding stationary period associated with a respective contextual model of the set of contextual models, and wherein generating the respective weights for the set of contextual models comprises calculating a posterior predictive probability of the observation for each of the set of contextual models.

6. The computer-implemented method of claim 1, wherein at least one of the set of contextual models is a linear Thompson Sampling bandit.

7. A non-transitory computer-readable storage medium comprising one or more processors and one or more memories storing computer-executable instructions that, when executed by the one or more processors, cause a computing device to:

obtain a set of contextual models, the set of contextual models comprising one or more contextual models associated with respective stationary states of a reward function and a short-term contextual model configured to consider a predefined number of recent observations;

obtain an observation comprising contextual data that comprising comprises user data;

select a contextual model from the set of contextual models based at least in part on the contextual data;

in accordance with the short-term contextual model being selected, add a new contextual model to the set of contextual models; and in accordance with a particular contextual model of the set of contextual models being selected, provide a recommendation selected by the particular contextual model, identify a reward associated with providing the recommendation, and update the particular contextual model based on the recommendation selected and the reward identified.

8. The non-transitory computer-readable storage medium of claim 7, wherein each of the one or more contextual models correspond to differing stationary states of the reward function.

9. The non-transitory computer-readable storage medium of claim 7, wherein the short-term contextual model is a sliding window model instance or a discounted model instance, wherein the short-term contextual model is configured to discard past observations at a constant rate.

10. The non-transitory computer-readable storage medium of claim 7, wherein the recommendation is selected by the particular contextual model from a set of recommendations, the set of recommendations being related to a music streaming service.

11. The non-transitory computer-readable storage medium of claim 7, wherein the reward is identified based at least in part on receiving clickstream data indicating a user presented the recommendation selected the recommendation, or failed to select the recommendation.

12. The non-transitory computer-readable storage medium of claim 7, wherein executing the instructions that selects the contextual model from the set of contextual models causes the computing device to:

for each of the set of contextual models, calculate a posterior predictive probability that the observation occurred during a respective stationary state associated with contextual model, wherein the contextual model is selected based at least in part on the posterior predictive probability.

13. The non-transitory computer-readable storage medium of claim 7, wherein executing the instructions that causes the computing device to:

update the short-term contextual model based at least in part on the identified reward.

14. The non-transitory computer-readable storage medium of claim 7, wherein executing the instructions further causes the computing device to maintain the set of contextual models, wherein maintaining the set of contextual models enables the computing device to detect reward shifts toward stationary states.

15. A computing device, comprising:

one or more processors; and one or more memories storing computer-executable instructions that, when executed by the one or more processors, cause the computing device to:

obtain a set of contextual models, the set of contextual models comprising one or more contextual models associated with a stationary state of a reward function and a short-term contextual model configured to considered a predefined number of recent observations;

obtain a content request comprising contextual data that comprises user data and device data;

select a contextual model from the set of contextual models based at least in part on the contextual data;

in accordance with the short-term contextual model being selected, generate, initialize, and add a new contextual model to the set of contextual models; and in accordance with one of the one or more contextual models being selected:

provide content determined by the selected contextual model;

monitor user actions taken subsequent to the content being provided; and update the contextual model based at least in part on the content provided and the user actions taken subsequent to the content being provided.

16. The computing device of claim 15, wherein selecting the contextual model from the set of contextual models further causes the computing device to obtain respective weights for the set of contextual models, each respective weight indicating a likelihood that an observation comes from a corresponding stationary period associated with a respective contextual model of the set of contextual models.

17. The computing device of claim 16, wherein executing the instructions further causes the computing device to update the respective weights for the set of contextual models.

18. The computing device of claim 15, wherein selecting the contextual model from the set of contextual models further causes the computing device to compute a set of posterior predictive probabilities comprising a posterior predictive probability of an observation under each of the set of contextual models.

19. The computing device of claim 18, wherein executing the instructions further causes the computing device to sample a reward parameter estimate from the set of posterior predictive probabilities.

20. The computing device of claim 18, wherein each posterior predictive probability from the set of posterior predictive probabilities utilizes only observations assigned to a particular contextual model of the set of contextual models.

* * * * *